UNITED STATES PATENT OFFICE.

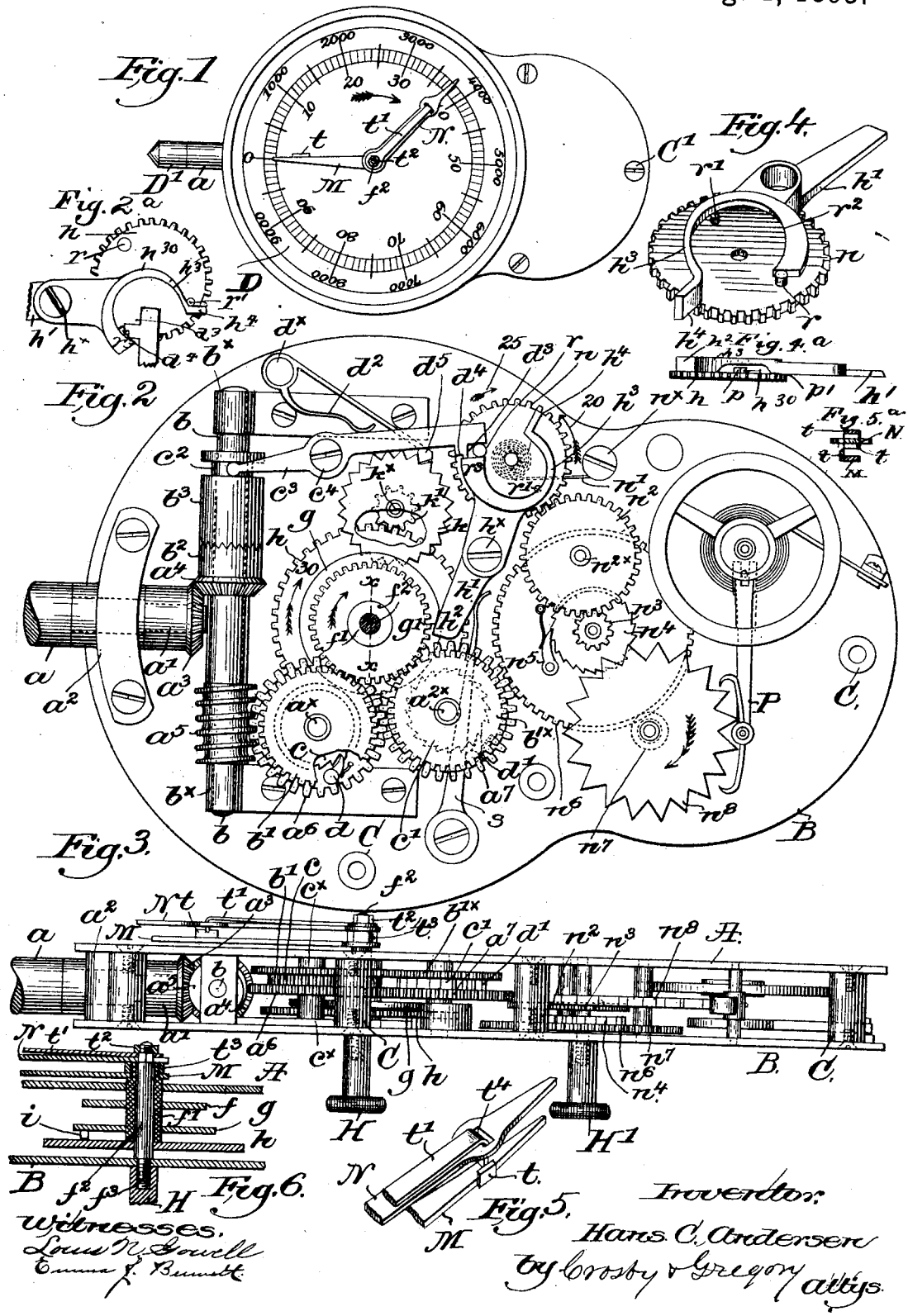

HANS C. ANDERSEN, OF CAMBRIDGE, ASSIGNOR OF ONE-HALF TO THORWALD HANSEN, OF WEST SOMERVILLE, MASSACHUSETTS.

SPEED-INDICATOR FOR SHAFTING.

SPECIFICATION forming part of Letters Patent No. 502,649, dated August 1, 1893.

Application filed November 25, 1892. Serial No. 453,028. (No model.)

*To all whom it may concern:*

Be it known that I, HANS C. ANDERSEN, a subject of the King of Sweden and Norway, residing at Cambridge, county of Middlesex, State of Massachusetts, have invented an Improvement in Speed-Indicators, of which the following description, in connection with the accompanying drawings, is a specification, like letters on the drawings representing like parts.

This invention relates to that class of devices for measuring the speed of rotating shafts or other objects by transmitting the number of revolutions in a given time to a counting or registering device from which the number of revolutions made by the object whose speed is to be measured may be conveniently read off. In all of the devices known to me for so measuring speed, considerable attention and skill on the part of the operator is required in order to accomplish properly and with any degree of accuracy the object desired, so that in unskillful hands these devices may give entirely erroneous registrations of speed, and the speed indicated for one and the same rotating object may differ according to the number of persons handling the measuring device in making the tests.

This invention has for its object the production of a speed measuring device which shall register the number of rotations made by a shaft or other revolving object in a given period of time, the registering mechanism being normally disconnected from the transmitting mechanism, a time movement adapted to run for a fixed period automatically disconnecting the said transmitting and registering mechanisms at the end of said fixed period of time, a locking device actuated by the winding of the time movement connecting the transmitting and registering mechanisms and also locking the time movement, which is released by or through the transmitting mechanism simultaneously with the registration of the revolutions of the rotating object measured.

In accordance therewith, my invention consists in the combination in a speed indicator, of a spindle adapted to be rotated in either direction by the object whose speed is to be measured, registering mechanism, and connecting means between it and the spindle, a time movement, and a locking device therefor, including a movable projection or pin, said projection or pin also acting to throw the connecting means into engagement with the spindle and registering mechanism by the winding of the time movement, substantially as will be described. Also in a speed indicator, a spindle adapted to be rotated in either direction, registering mechanism, and connecting means between it and the spindle, combined with a time-movement, and a locking device therefor, including a movable projection or pin, said projection or pin also acting to throw the connecting means into engagement with the spindle and registering mechanism when the time movement is wound, and releasing mechanism controlled by rotation of the spindle to free the time movement from detention by the locking device, substantially as will be described. Also in a speed indicator, a spindle adapted to be rotated in either direction, by contact with the object whose speed is to be measured, registering mechanism, and connecting means including a lever and a detent therefor between it and the spindle, a time movement adapted to run for a fixed period of time, and a stop on a moving part thereof brought into contact with and moving said detent away from the lever to operate said connecting means and thereby disconnect the spindle and registering mechanism at the end of the fixed period of time, substantially as will be described.

Other features of this invention will be hereinafter described, and particularly pointed out in the claims at the end of this specification.

Figure 1 is a top view of a speed indicator embodying my invention, the inclosing case being in position. Fig. 2 is a greatly enlarged view with the top plate removed, showing the actuating mechanism. Fig. 2ª, is a detail showing the clutch lever and bifurcated lever in position when the time-movement has run down. Fig. 3 is a side elevation of the mechanism shown in Fig. 2, the top plate and registering hands being in position. Fig. 4 is a detail of a part of the locking device including the detent. Fig. 4ª, is a detail in side elevation, of the bifurcated lever, showing the recess therein. Fig. 5 is an enlarged view in perspective showing the connections between the ends of the hands; and Fig. 5ª, is a sectional detail of the outer ends of the hands and their connections, the hands being shown as one over the other. Fig. 6 is a section taken on the line x—x Fig. 2

The inclosing case composed of top and bottom plates A, B, separated by posts C secured in place by screws C', serve as supporting means for the mechanism to be described, the said case having side walls beyond the operating parts and between the top and bottom plates to keep out dust and dirt.

Referring to Figs. 2 and 3, I have herein shown the transmitting spindle $a$ as reduced at its inner end as at $a'$, and held in a bearing $a^2$ secured to the bottom plate by suitable screws, the reduced portion $a'$ shown in dotted lines having fast on its inner end a bevel gear $a^3$ in mesh with another bevel gear $a^4$ having a rearwardly extended serrated hub $b^2$ forming one part of a clutch mechanism to be described, the said gear and its hub being loose on a shaft $b$ rotatable in suitable bearings $b^\times$ secured to the bottom plate B, said shaft $b$ having secured thereto at one end a worm $a^5$ engaging a worm gear $a^6$ loosely supported on a spindle $a^\times$ and in mesh with a like gear $a^7$ loose on the post or spindle $a^{2\times}$. The gear $a^6$ has secured to its upper side a spring-pawl $d$ adapted to be engaged by teeth of a ratchet $c$ fast to the under side of or forming part of a gear $b'$ also loose on the post or spindle $a^\times$, the said gears being held in place on the spindle by suitable collars $c^\times$, see Fig. 3, the gear $b'$ being in mesh with a gear $f$ which latter gear is also in mesh with a gear $b'^\times$ similar to the gear $b'$, and loose on the spindle or stud $a^{2\times}$ and having secured to its under side a ratchet wheel $c'$, see dotted lines Fig. 2, to be engaged by a spring-pawl $d'$ on the gear $a^7$.

From an inspection of Fig. 2 it will be seen that no matter in which direction the shaft $b$ and its worm $a^5$ are rotated by rotation of the bevel gear $a^3$, the gear $f$ will always be rotated in the direction of the arrow thereon, for when the shaft $b$ is rotated in one direction, motion will be transmitted through the worm $a^5$, gear $a^6$, pawl $d$, (then engaging and moving ratchet $c$) and gear $b'$, to the gear $f$, the pawl $d'$ during such rotation slipping over the teeth of its ratchet $c'$ and not rotating it or the connected parts, and when the shaft $b$ is rotated in the opposite direction the motion will be transmitted through worm $a^5$, gears $a^6$ and $a^7$, to pawl $d'$, which then engages the teeth of and moves its ratchet $c'$, and thereby the gear $b'^\times$, the latter meshing with and turning gear $f$ in the same direction as before, the pawl $d$ carried by gear $a^6$ at such time slipping over the teeth of the ratchet $c$.

On the end of the shaft $b$, opposite to the worm $a^5$, I have placed a clutch hub $b^3$ having a serrated face to engage the serrations on the face of the hub $b^2$, said clutch being splined to the shaft $b$ to rotate therewith, while longitudinally movable thereon, by or through a lever $c^3$ pivoted at $c^4$, one end of said lever engaging an annular groove $c^2$ of usual construction in the clutch. The clutch lever $c^3$ is acted upon between its pivot $c^4$ and outer end by one end $d^2$ of a spring secured at $d^\times$ to the casing, to thereby normally retract the clutch from engagement with the hub $b^2$, the outer or free end of said lever having shoulders at $d^3$ and $d^4$, for a purpose to be described. The other end of the spring $d^2$ is provided at its outer end with a detent $d^5$ for a gear $k$, to be described. The gear $f$ is attached to a sleeve $f'$, which is rotatable on a spindle $f^2$, see Fig. 6, the said sleeve having also secured to it a disk $g$ having upon its under side a single pin or tooth $i$, see Fig. 6, the said tooth $i$ being adapted to engage the gear $k$ at each rotation of the disk $g$ when mechanically driven, and move said gear the distance of a single tooth, the said gear $k$ being fast on the spindle $k^\times$, to which is also secured a pinion $k'$, it in turn meshing with a large gear $h$, secured to and moving with the spindle $f^2$ below the sleeve $f'$, the said spindle being reduced and threaded as at $f^3$ to extend loosely through the bottom plate B, and to receive upon it the thumb-screw or stud H, see Figs. 3 and 6, by which to manually rotate the said spindle, the upper end of the spindle being also reduced and squared to receive thereupon the hand N, and spring-catch $t'$ held in place by a nut $t^2$ screwed onto the threaded extremity of the spindle, as best shown in Fig. 6.

The hand N forms the hundreds and thousands hand of the registering mechanism, and is moved past a series of numbers on the dial D, see Fig. 1, indicating hundreds and thousands. The upper end of the loose sleeve $f'$ is squared and also threaded to receive upon the squared portion the hand M and upon the threaded portion a nut or washer $t^3$, the said hand forming the units and tens hand of the registering mechanism and moving past a series of numbers on the dial from 0 up to 99.

The hand M, has, as herein shown, secured thereto and projecting from its upper side a lug or ear $t$ beveled outwardly and downwardly at its upper edge, as best shown in Fig. 5, and adapted to co-operate with the downturned end of a yielding or spring catch $t'$ rotating with the hand N, the downturned end of said catch $t'$ being extended through a slot $t^4$ in the said hand. When the hands are rotated in the direction of the arrow, Fig. 1 by or through the worm $a^5$ and intermeshing gears as described, the units hand M will pass by and underneath the hundreds hand N because the beveled top of the lug or ear $t$ will raise the end of the catch $t'$ and slip thereunder, but if the hands are to be set at zero, which is always accomplished manually by grasping the thumb-piece H and rotating the hand N secured to the spindle $f^2$ as described, in the direction of the arrow Fig. 1, the downturned end of the catch $t'$ will engage the straight side of the lug or ear $t$ see Fig. $5^a$ and will move it and the hand M simultaneously to the zero point of the dial where the hands are positively stopped. This stoppage is caused by the pin $i$ on the disk $g$ moving at a slow speed, coming into engagement with the teeth of the gear $k$, the said gear $k$ at the time being rapidly moved by the pinion $k'$ engaged and rotated by the gear $h$, fast on the spindle $f^2$ actuated by the thumb-piece H, as will be described. The hands accordingly can never be moved beyond the zero point manually, and so long as the thumb-piece is rotated in the direction of the arrow Fig. 1, the hands will be moved in that direction until they reach zero, and it will be seen that, no matter what may be the relative position of the two hands, they may be always set at zero by the simple turning of the thumb-piece H in the direction of the arrow, until the hands are brought to a full stop.

The time movement consists of a gear or toothed disk $n$, shown on a large scale in Fig. 4, having a spring $n'$ secured to its shaft at one end, and to the casing at $n^\times$ at the other end, said spring being adapted to be wound by rotation of the disk or gear $n$ in the direction of the arrow 25, Fig. 2, the disk or gear $n$ meshing with an intermediate gear $n^2$ on a shaft $n^{2\times}$, said intermediate gear engaging a pinion $n^3$ having a ratchet $n^4$ fast thereto, the teeth of which are engaged when moved in one direction by a pawl $n^5$ on a loosely supported gear $n^6$ in mesh with a pinion $n^7$ on the shaft of the escapement wheel $n^8$, said wheel being controlled in its rotation by a let-off or escapement P common in watch and clock movements. The shaft of the pinion $n^3$ is extended loosely through the lower plate B of the case, and has a thumb-nut H' secured thereto, see Fig. 3, whereby the time movement may be wound, rotation of said thumb-piece in such direction as will turn the pinion $n^3$ in the direction of the arrow 25, rotating said pinion and its enmeshed gear $n^2$, thereby rotating the gear or disk $n$ in the direction of the arrow 25 and winding up the spring $n'$, without affecting the movement of the escape wheel $n^8$ and the let-off P, because the teeth of the ratchet $n^4$ will slip under the pawl $n^5$, described.

The disk or gear $n$ has projecting from one side thereof, herein shown as the upper side, a pin or projection $r$, and another pin or projection $r'$ upon the same side, which latter pin I term a stop, and when the time movement is wound, the disk $n$ rotates, as has been described in the direction of the arrow 25, Fig. 2, the pin $r$ at such time passing through the recess $h^{30}$ of lever $h'$ see Figs. $2^a$ and $4^a$ along a curved cam surface $r^2$ formed on the inner side of and extending to the detent $r^3$ of the bifurcated end of the lever $h'$, pivoted at $h^\times$ to the casing and acted upon at its opposite end by a spring $s$. The said spring normally moves said lever into the position shown in Figs. 2 and 4, after the locking pin $r$ has passed beyond the cam portion $r^2$ and has impinged against the outer end of and moved the clutch lever $c^3$ into the position shown in Fig. 2, the lever being shown in Fig. 4 as turned around to better show the cam surface and the detent $r^3$. The said movement of the spring $s$ throws the end of the detent $r^3$ across the path just traversed by the pin $r$. In such position the clutch is held in engagement with the hub $b^2$ and the time movement is locked by the detent $r^3$ carried by the lever $h'$ co-operating with the locking pin $r$, the latter being held between the detent and the shoulder $d^3$ of the lever $c^3$, see Fig. 2. At such time, when the hands have been brought to zero, a depression or notch $g'$ in the edge of the disk $g$ will have been brought opposite to the end $h^2$ of the lever $h'$, the spring $s$ forcing the end $h^2$ of the lever into said recess as soon as the pin $r$ has passed beyond the end of the cam surface $r^2$, the parts being then in the position shown in Fig. 2. The actuating spindle $a$ is now by means of the clutch in engagement with the registering mechanism, and the time movement, wound manually as described, is locked from movement by the detent $r^3$ carried by the lever $h'$, and the locking pin $r$, as shown clearly in Fig. 2.

The rotations of the object to be measured are communicated to the spindle $a$ through a preferably yielding or rubber tip D', and, as soon as the spindle has through the intervening mechanism rotated the disk $g$ in the direction of the arrow 30, Fig. 2, sufficiently to remove the end $h^2$ of the lever to the right, Fig. 2, out of the notch $g'$, and onto the periphery of the disk, the upper end of the said lever will be moved in an opposite direction or toward the left, Fig. 2 until the detent $r^3$ is moved away from and to one side of the locking pin $r$, and the disk or gear $n$ will thereupon be free to rotate under the influence of the spring $n'$ in the direction of the arrow 20, and the time movement will begin to run, the lever $h'$ being moved upon its pivot as described, by the return of the pin $r$ along the cam surface $r^2$, until the detent $r^3$ engages the shoulder $d^4$ of the clutch lever $c^3$, retaining said lever in position to maintain the clutch in operative engagement with the hub $b^2$.

Referring to Figs. 4 and $4^a$, the portion $h^3$ of the bifurcated end of the lever $h'$ is shown as cut away at its under-side at $h^{30}$, see Fig. $4^a$ to admit the passage thereunder of the pin or stop $r'$, first when the disk $n$ is rotated in the direction of the arrow 20, the outer end of said part $h^3$ being enlarged as at $h^4$, so that its outermost side is engaged by the said pin $r'$ in the continued rotation of said disk $n$, the effect of continued rotation of the disk after such engagement being to turn the lever $h'$ on its pivot until the detent $r^3$ is moved farther to the left Fig. 2, and entirely beyond the shoulder $d^4$ of the clutch lever, thereby permitting the spring $d^2$ to turn said lever on its pivot and quickly disconnect the clutch, the pin $r$ having also passed through the cut-away portion $h^{30}$, the parts finally assuming the position shown in Fig. 2ª. During the said movement of the lever $h'$ by the pin $r'$ the time movement has been running, and at the instant that the time movement has run for a predetermined period, the pin $r'$ moves the lever $h'$ sufficiently to carry the detent $r^3$ thereof beyond the shoulder $d^4$, as described, so that simultaneously with the expiration of the period of time, the clutch is disconnected by action of the spring $d^2$ on lever $c^3$, and the registering mechanism thereby brought to a standstill, whether the spindle $a$ is retained in engagement with the rotating object or not, the movement of the clutch being entirely beyond the control and independent of the operator. When high speeds are being measured, the lever $h'$ would vibrate owing to the rapid rotation of the notched disk $g$, were it not for the shoulder $d^4$ on the lever $c^3$, which engages the detent $r^3$ of said lever $h'$, the spring $s$ keeping the lever snugly in such shoulder and returning the lever to its normal position, shown in Fig. 2, whenever the locking pin $r$ by the winding of the spring $n'$, has passed along the cam surface $r^2$ and beyond the said detent $r^3$ on the lever.

The dial D has a series of graduations thereon, as shown in Fig. 1, and a series of numbers from 0 up to 99 is indicated on one side of the graduations, while on the other side the numbers indicate hundreds and thousands, both series of numbers starting from a common zero point. When the hands M and N are set to 0 manually, as hereinbefore described, they are not brought immediately over the zero point, but a little to one side thereof, so that when the disk $g$ is rotated, the hands will be brought mechanically to the exact zero point at the same instant that the end $h^2$ of the lever $h'$ has been entirely removed from the notch $g'$ and onto the periphery of the disk $g$, so that the registering will begin accurately with the release of the time movement and without counting a few preliminary revolutions of the spindle $a$ necessary to turn the disk $g$ to throw out the lever $h'$ as stated. The hands are brought to a postitive stop adjacent to the zero point when the thumb-piece H is rotated, by reason of the fact that by such rotation the gear $h$ is moved in the direction of the arrow 30, it in turn rotating the pinion $k'$ and attached gear $k$ very rapidly, the hand M fast on the sleeve $f'$, and moved through the hand N, rotating the gear $f$ and disk $g$ in the same direction as the gear $h$, and at the same speed, which is very much slower than the speed of the gear $k$, as must be obvious, so that when the pin or tooth $i$ on the under side of said disk is brought into engagement with the teeth of the gear $k$, the peripheries of said gear $k$ and disk $g$ are rotating at different speeds, as just described, and as the gear and disk are driven by the same power, viz:—the thumb-piece, the result is a locking of the said gears when the pin $i$ is in line with the studs $f^2$ and $k^\times$, which point is made to correspond to the stopping place of the hands adjacent to the zero point of the dial. It is thus impossible to overrun the zero point when setting the hands.

It is impossible to wind the time movement fully and lock the same from running, by the devices described, until the hands have been brought to zero, because of the notched disk $g$ and lever $h'$, as the end $h^2$ cannot be moved into normal position in the notch $g'$ until the hands are at zero, so that in order to measure the speed of an object the hands must always be set at zero by the operator, and thereafter the clock wound and automatically locked. This makes it impossible to start the registering mechanism and time movement at different times, and in consequence the registration must always be exact.

In the construction herein shown, the arrangement of the gearing intermediate of the worm $a^5$ and gear $f$ is such that said gear $f$ rotates once for every twenty-five revolutions of the spindle $a$, and a hundred revolutions so imparted to the gear $f$ rotates the gear $h$ once, and the time movement is set to run for one quarter of a minute, so that in connection with the graduations on the dial, the revolutions of the spindle $a$ are not registered simply for the number made in one quarter of a minute, but for four times the number of revolutions made in one quarter of a minute, and consequently the reading of the dial shows at once the number of rotations per minute of the shaft or other object measured.

The multiplying train of gears comprises the worm $a^5$, gears $a^6$, $a^7$, each of said latter having twenty-five teeth, gears $b'$, $b'^\times$, ratchet wheels $c$ and $c'$ and pawls $d$, $d'$.

The gear $h$ is provided with fifty teeth, the gear $k$ with twenty-teeth, and the pinion $k'$ with ten teeth, so that every revolution of the disk $g$ in unison with gear $f$ when driven by the train of gears will, through the pin or tooth $i$ on the disk $g$, turn the gear $k$ for a distance of one of its teeth, the detent $d^5$ preventing overrunning, it turning the pinion $k'$ so that the gear $h$ is moved one-half a tooth, and in consequence, the hand N is moved by and in unison with the gear $h$ one space on the dial for every complete revolution of the hand M moved by and in unison with disk $g$. When the mechanism just described is rotated through the revolutions of the spindle $a$, no locking of the pin $i$ and gear $k$ can take place, for the pin imparts motion to the gear intermittingly, it in turn ultimately rotating the large gear $h$ by means of the intermediate pinion $k'$, whereas when the hands are being placed at zero, both the disk $g$ carrying pin $i$ and the gear $h$, are rotated together and at the same speed by the thumb-piece H. If the time movement was set to run for one-half of a minute, the gears $a^6$ and $a^7$ would be provided with fifty teeth, and so on, but I prefer to use the quarter of a minute period for the time movement and the gearing, as described, as it is a very convenient construction and answers every purpose.

As will be understood from the foregoing, the operation of this device is entirely automatic after the hands have been set to zero and the time movement wound, so that in measuring the rotations of an object no care or attention is required other than to press the end of the yielding tip of the spindle against the center of the rotating object, no matter which way it rotates holding it there as long as the hands continue to rotate. It is not even necessary to note the movement of the hands if the indicator is held in operative position for a longer period than one-quarter of a minute, so that the device is well adapted for use in places where the light is poor, and furthermore, does not require a skilled operator to handle it. The indicator is small and compact, taking up but little room, and is so thoroughly protected that disarrangement of the operating parts is impossible without crushing the inclosing case. The dial is protected by a thick glass.

This invention is not restricted to the exact construction and arrangement of the various parts herein shown, to the particular trains of gearing, nor to a time movement adapted to run for only one-quarter of a minute, as the same may be varied without departing from my invention, the gist of which I consider to reside in the automatic throwing into engagement of the spindle and registering mechanism by the winding of the time movement after the hands have been manually brought to zero, and in the exact and simultaneous stoppage of the registering mechanism and time movement at the end of the predetermined time, controlled by or through the time movement.

I claim—

1. In a speed indicator, a spindle adapted to be rotated in either direction by the object whose speed is to be measured, registering mechanism, and connecting means between it and the spindle, combined with a time-movement, and a locking device therefor, including a movable projection or pin, said projection or pin also acting to throw the connecting means into engagement with the spindle and registering mechanism by the winding of the time-movement, substantially as described.

2. In a speed indicator, a spindle adapted to be rotated in either direction by the object whose speed is to be measured, registering mechanism, and connecting means between it and the spindle, combined with a time-movement, a locking device therefor, including a movable projection or pin, said projection or pin also acting to throw the connecting means into engagement with the spindle and registering mechanism when the time-movement is wound, and releasing mechanism controlled by rotation of the spindle to free the time movement from detention by the locking device, substantially as described.

3. In a speed indicator, a spindle adapted to be rotated in either direction by contact with the object whose speed is to be measured, registering mechanism, intermediate devices, including an actuating lever and its detent, between said mechanism and the spindle to connect them during a fixed period of time, a time-movement adapted to run for said period, and a stop on a moving part of said time-movement, said stop, at the end of the period of time being brought into position to move the said detent away from the actuating lever, to thereby disconnect the spindle and registering mechanism and stop the latter at the end of the period, substantially as described.

4. In a speed indicator, a spindle adapted to be rotated in either direction by the shaft whose speed is to be measured, registering mechanism, connecting means between it and the spindle adapted to be thrown into and out of engagement, a time-movement, a rotatable part thereof adapted when said movement is wound to actuate said connecting means positively and throw the registering mechanism into operative connection with the spindle, and a stop pin rotated by said time movement when running to throw said means out of operative connection automatically at the end of a fixed period of time, a locking device including a detent for the time-movement, and a releasing mechanism controlled by the said registering mechanism, to move said detent to free the time movement substantially as described.

5. In a speed indicator, registering mechanism, a spindle rotatable in either direction, a clutch mechanism between the spindle and registering mechanism, means controlled by the winding of a time-movement, to operate the clutch in one direction to connect the spindle and registering mechanism, and separate means controlled by the unwinding of the time movement to automatically operate the clutch in the other direction and disconnect the spindle and registering mechanism at the end of a fixed period of time, substantially as described.

6. In a speed indicator, mechanism including rotatable hands, a catch on one to at times engage the other of said hands, a graduated dial over which the hands move, and a train of gears connecting said hands, combined with manually operated mechanism rotatable with one of said hands to set the registering hands simultaneously at zero by means of said catch, and a positively actuated stopping device included in said train of gears to prevent the movement of said hands beyond zero when manually operated, substantially as described.

7. In a speed indicator, a rotatable spindle, registering mechanism therefor including rotatable hands and a dial, and manually rotated mechanism positively moving with one of said hands to set the hands simultaneously at zero, combined with a time-movement adapted to run for a fixed period of time, means to wind it manually independent of the position of the hands, and a locking device, including a detent, for the time-movement, said detent being controlled by the position of the hands and maintained inoperative thereby until they have been brought to zero, substantially as described.

8. In a speed indicator, a time-movement and means for manually winding it, and a detent adjacent thereto, combined with a pin or projection on a rotatable part of said time-movement adapted to be moved into operative engagement with and to be held by said detent when the movement is wound to lock the same, substantially as described.

9. In a speed indicator, a time-movement, a detent normally in the path of movement of a locking pin, and a locking pin or projection on a rotatable part of said time-movement, moved by rotation of said part into operative engagement with and held by said detent when the movement is wound, combined with independent means to move said detent and release said locking pin or projection and free the time-movement, substantially as described.

10. In a speed indicator, a registering mechanism including a units hand, actuating mechanism therefor, a hundreds hand, gearing connecting said hands, and a graduated dial, combined with a setting device on the extended shaft of one of said hands to rotate it manually to set it, a yielding catch on the said hand and a beveled projection on the other hand, whereby when the hands are mechanically rotated the catch rides over the projection and one hand can pass the other, and when the setting hand is manually rotated the catch engages the side of said projection and rotates the other hand simultaneously, substantially as described.

11. In a speed indicator, a spindle rotatable in either direction, registering mechanism therefor, a clutch intermediate said spindle and mechanism, and a shouldered lever to move the clutch, combined with a time-movement, a locking pin moving therewith to engage and actuate said shouldered lever when the time-movement is wound, and place the clutch in operative position, a detent to co-operate with said pin and hold the time-movement, and means to withdraw the detent from co-operation with the pin to thereby free the time movement, and to move said detent into engagement with the shouldered lever to prevent vibration of the detent and maintain the time-movement free, substantially as described.

12. In a speed indicator, a spindle rotatable in either direction, registering mechanism therefor, a clutch to connect them, and an actuating lever for the clutch combined with a disk rotatable by and forming part of a time-movement, a locking pin, and a separate stopping pin or projection on said disk, a detent lever adapted to be moved successively by said pins, one end of said detent lever co-operating with the clutch actuating lever and locking pin to maintain them stationary, and a rotatable cam to engage and turn the detent lever away from and to free the locking pin, the stopping pin thereafter moving the lever out of engagement with and releasing said clutch actuating lever, substantially as described.

In testimony whereof I have signed my name to this specification in the presence of two subscribing witnesses.

HANS C. ANDERSEN.

Witnesses:
JOHN C. EDWARDS,
GEO. W. GREGORY.